United States Patent
Harata et al.

(10) Patent No.: US 10,308,515 B2
(45) Date of Patent: Jun. 4, 2019

(54) METHOD FOR PRODUCING CASI$_2$-CONTAINING COMPOSITION AND SILICON MATERIAL

(71) Applicant: KABUSHIKI KAISHA TOYOTA JIDOSHOKKI, Kariya-shi, Aichi (JP)

(72) Inventors: Masanori Harata, Kariya (JP); Nobuhiro Goda, Kariya (JP); Takashi Mohri, Kariya (JP); Hiroki Oshima, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 0 days.

(21) Appl. No.: 15/735,281

(22) PCT Filed: May 20, 2016

(86) PCT No.: PCT/JP2016/002478
§ 371 (c)(1),
(2) Date: Dec. 11, 2017

(87) PCT Pub. No.: WO2016/199359
PCT Pub. Date: Dec. 15, 2016

(65) Prior Publication Data
US 2018/0170761 A1    Jun. 21, 2018

(30) Foreign Application Priority Data
Jun. 12, 2015  (JP) ................................. 2015-119271

(51) Int. Cl.
*C01B 33/06*  (2006.01)
*C08L 27/04*  (2006.01)
(Continued)

(52) U.S. Cl.
CPC .............. *C01B 33/06* (2013.01); *C08L 27/04* (2013.01); *C08L 27/12* (2013.01); *H01M 4/381* (2013.01);
(Continued)

(58) Field of Classification Search
None
See application file for complete search history.

(56) References Cited

U.S. PATENT DOCUMENTS

| | | |
|---|---|---|
| 7,682,585 B2 | 3/2010 | Lynch et al. |
| 9,527,748 B2 | 12/2016 | Sugiyama et al. |
| 2017/0012282 A1 | 1/2017 | Kondo et al. |
| 2017/0309901 A1 | 10/2017 | Harata |

FOREIGN PATENT DOCUMENTS

| | | | |
|---|---|---|---|
| JP | 2009-535289 A | 10/2009 | |
| JP | 2011-090806 A | 5/2011 | |

(Continued)

OTHER PUBLICATIONS

Hirate et al.; JP2014123537 translation provided by Google; Sep. 30, 2018.*

(Continued)

*Primary Examiner* — Guinever S Gregorio
(74) *Attorney, Agent, or Firm* — Sughrue Mion, PLLC

(57) ABSTRACT

Provided is a method for producing a CaSi$_2$-containing composition, the method including:
a molten metal step of adding Ca and/or M (M is at least one element selected from elements of groups 3 to 9) to a CaSi$_2$-containing composition containing crystalline silicon to prepare a molten metal containing Ca, M and Si that satisfy the following condition:
when a molar ratio of Ca, M and Si is x:y:z (x+y+z=100), x, y and z satisfy $23 < x \le 100/3$, $0 < y < 10$ and $64 < z \le 200/3$, respectively; and
(Continued)

a cooling step of cooling the molten metal to obtain a CaSi$_2$-containing composition containing a reduced amount of crystalline silicon.

4 Claims, 3 Drawing Sheets

(51) Int. Cl.
*C08L 27/12* (2006.01)
*H01M 4/38* (2006.01)
*H01M 10/052* (2010.01)
*H01M 4/62* (2006.01)
*H01M 4/02* (2006.01)

(52) U.S. Cl.
CPC .......... *H01M 4/386* (2013.01); *H01M 4/625* (2013.01); *H01M 10/052* (2013.01); *C01P 2002/72* (2013.01); *C01P 2004/03* (2013.01); *C08L 2203/20* (2013.01); *H01M 2004/027* (2013.01); *H01M 2004/028* (2013.01)

(56) References Cited

FOREIGN PATENT DOCUMENTS

| | | |
|---|---|---|
| JP | 2014-123537 A | 7/2014 |
| WO | 2014/080608 A1 | 5/2014 |
| WO | 2015/114692 A1 | 8/2015 |
| WO | 2016/042728 A | 3/2016 |
| WO | 2016/042728 A1 | 3/2016 |

OTHER PUBLICATIONS

Shoji Yamanaka et al., "New Deintercalation Reaction of Calcium From Calcium Disilicide. Synthesis of Layered Polysilane," Materials Research Bulletin, 1996, pp. 307-316, vol. 31, No. 3.
H. D. Fuchs et al., "Porous silicon and siloxene: Vibrational and structural properties," Physical Review B, Sep. 15, 1993, pp. 8172-8190, vol. 48, No. 11.
International Search Report for PCT/JP2016/002478, dated Jul. 5, 2016 (PCT/ISA/210).
English translation of Reply to the Written Opinion dated Jul. 5, 2016.

* cited by examiner

METHOD FOR PRODUCING CASI$_2$-CONTAINING COMPOSITION AND SILICON MATERIAL

CROSS REFERENCE TO RELATED APPLICATIONS

This application is a National Stage of International Application No. PCT/JP2016/002478 filed May 20, 2016, claiming priority based on Japanese Patent Application No. 2015-119271, filed Jun. 12, 2015, the contents of all of which are incorporated herein by reference in their entirety.

TECHNICAL FIELD

The present invention relates to methods for producing a CaSi$_2$-containing composition and a silicon material.

BACKGROUND ART

Silicon materials are known to be used as a constituent of a semiconductor, a solar battery, a secondary battery or the like, and studies on silicon materials are actively conducted in recent years.

For example, Non-Patent Literature 1 describes synthesizing layered polysilane by reacting CaSi$_2$ with acid.

Patent Literature describes synthesizing layered polysilane by reacting CaSi$_2$ with acid, and describes that a lithium ion secondary battery having the layered polysilane as an active material exhibits a suitable capacitance.

Patent Literature 2 describes synthesizing a layered silicon compound of which main component is layered polysilane in which Ca is removed by reacting CaSi$_2$ with acid, and heating the layered silicon compound at not less than 300° C. to produce a silicon material from which hydrogen is removed, and also describes that a lithium ion secondary battery having the silicon material as an active material exhibits a suitable capacity retention rate.

In CaSi$_2$, impurities such as crystalline silicon, Ca$_{14}$Si$_{19}$, and the like occasionally exist. Non-Patent Literature 2 describes subjecting CaSi$_2$ that contains impurities to a heating treatment at high temperature so as to convert the impurities into CaSi$_2$.

CITATION LIST

Patent Literature

Patent Literature 1: JP2011090806 (A)
Patent Literature 2: WO2014/080608

Non-Patent Literature

Non-Patent Literature 1: PHYSICAL REVIEW B, Volume 48, 1993, p. 8172-p. 8189
Non-Patent Literature 2: Materials Research Bulletin Volume 31, Issue 3, 1996, p. 307-p. 316

SUMMARY OF INVENTION

Technical Problem

As described above, impurities such as crystalline silicon, Ca$_{14}$Si$_{19}$ or the like occasionally exist in CaSi$_2$. The crystalline silicon contained in CaSi$_2$ persists as the crystalline silicon even when CaSi$_2$ is converted into a layered silicon compound or a silicon material by the production method described in Patent Literature 2. The present inventors found that when crystalline silicon is used as an active material of a secondary battery, the crystalline silicon expands and contracts by charging and discharging, and such expansion and contraction possibly cause cracking, and result in deterioration in performance of the secondary battery.

The present invention was made in light of such circumstances, and aims at providing a method for removing crystalline silicon from CaSi$_2$ containing the crystalline silicon.

Solution to Problem

The present inventors have conducted thorough investigation with much trial and error, and found that a CaSi$_2$-containing composition that is obtained by cooling molten metal containing Ca, Si and a small amount of specific metal contains reduced amounts of crystalline silicon and Ca$_{14}$Si$_{19}$, as compared with CaSi$_2$ that is obtained by cooling a molten metal containing only Ca and Si. On the basis of these findings, the present inventors have completed the present invention.

Specifically, a method for producing a CaSi$_2$-containing composition of the present invention includes:

a molten metal step of adding Ca and/or M (M is at least one element selected from elements of groups 3 to 9) to a CaSi$_2$-containing composition containing crystalline silicon to prepare a molten metal containing Ca, M and Si that satisfy the following condition:

when a molar ratio of Ca, M and Si is x:y:z (x+y+z=100), x, y and z satisfy 23<x≤100/3, 0<y<10 and 64<z≤200/3, respectively; and a cooling step of cooling the molten metal to obtain a CaSi$_2$-containing composition containing a reduced amount of crystalline silicon.

Advantageous Effects of Invention

By the method for producing a CaSi$_2$-containing composition of the present invention, a CaSi$_2$-containing composition containing reduced amounts of crystalline silicon and Ca$_{14}$Si$_{19}$ is provided.

DESCRIPTION OF EMBODIMENTS

Figure 1:
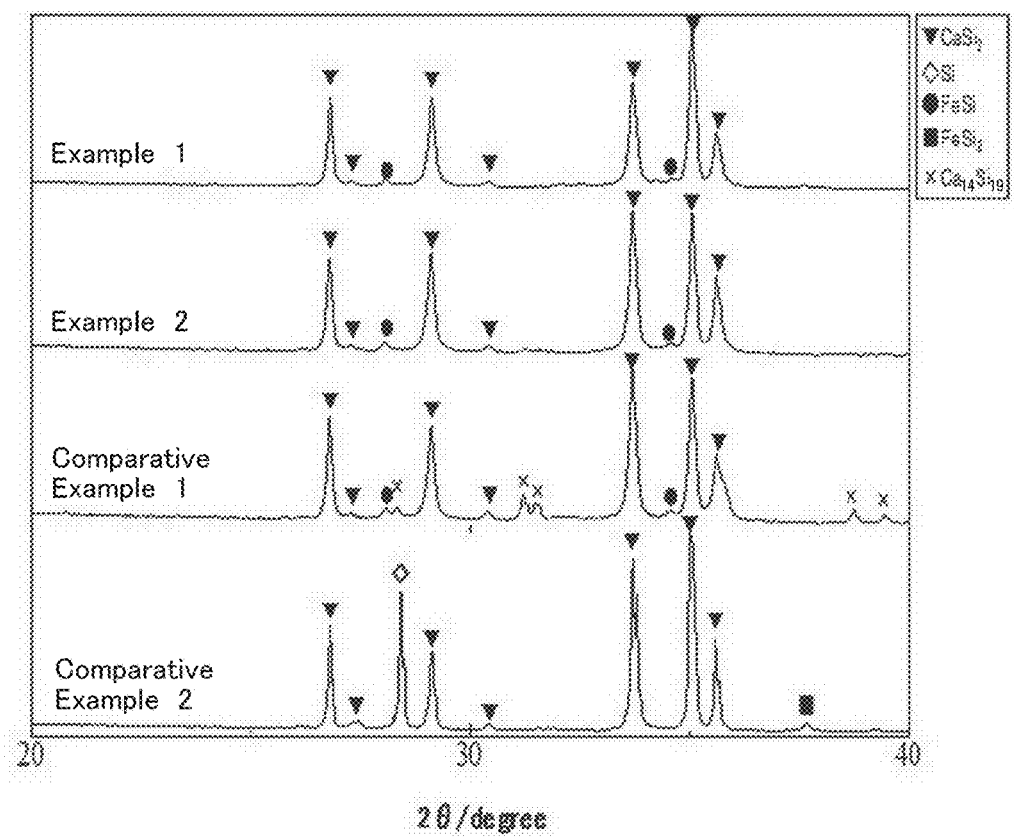
FIG. 1 shows X-ray diffraction charts of CaSi$_2$-containing compositions of Example 1, Example 2, Comparative Example 1 and Comparative Example 2.

The following describes embodiments of the present invention. Unless mentioned otherwise in particular, a numerical value range of "x to y" described in the present specification includes, in a range thereof, a lower limit "x" and an upper limit "y". A numerical value range is formed by arbitrarily combining such upper limit values, lower limit values, and numerical values described in Examples. In addition, numerical values arbitrarily selected within a numerical value range are used as upper limit and lower limit numerical values.

The method for producing a $CaSi_2$-containing composition of the present invention is featured by including:

a molten metal step of adding Ca and/or M (M is at least one element selected from elements of groups 3 to 9) to a $CaSi_2$-containing composition containing crystalline silicon (hereinafter, also referred to as "crude $CaSi_2$") to prepare a molten metal containing Ca, M and Si that satisfy the following condition (hereinafter, also referred to as "the condition of the present invention"):

when a molar ratio of Ca, M and Si is x:y:z (x+y+z=100), x, y and z satisfy $23<x\leq100/3$, $0<y<10$ and $64<z\leq200/3$, respectively; and a cooling step of cooling the molten metal to obtain a $CaSi_2$-containing composition containing a reduced amount of crystalline silicon (hereinafter, also referred to as "$CaSi_2$-containing composition of the present invention").

The composition of the molten metal satisfying the condition of the present invention results in preferential precipitation of $CaSi_2$, $MSi_2$, MSi and the like in the cooling step. M is at least one element selected from elements of groups 3 to 9, and is an element capable of forming $MSi_a$ ($1/3\leq a\leq3$) such as $MSi_2$ or MSi by binding with Si. Among the elements, M may be a single element or a plurality of elements. Preferred examples of M include Ti, Zr, Hf, V, Nb, Ta, Cr, Mo, W, Sc, and Fe. Examples of $MSi_a$ include $TiSi_2$, $ZrSi_2$, $HfSi_2$, $VSi_2$, $NbSi_2$, $TaSi_2$, $CrSi_2$, $CrSi_{1/3}$, $MoSi_2$, $MoSi_{1/3}$, $MoSi_{3/5}$, $WSi_2$, and $FeSi_2$.

Since crude $CaSi_2$ contains crystalline silicon, the composition formula of Ca and Si in crude $CaSi_2$ is $Ca_{x1}Si_{z1}$ ($z_1>2\times x_1$). When M is contained in crude $CaSi_2$, and M forms MSi by binding with Si, the composition formula of Ca, M and Si in the crude $CaSi_2$ is $Ca_{x2}M_{y2}Si_{z2}$ ($z_2>2\times x_2+y_2$). That is, the quantity of Si is considered to be excessive in the composition of crude $CaSi_2$ to such an extent that crystalline silicon is preferentially precipitated.

However, by the composition of the molten metal satisfying the condition of the present invention, $CaSi_2$, $MSi_2$, MSi and so on are preferentially precipitated in the cooling step, and Si in the molten metal is consumed by precipitation of $CaSi_2$, $MSi_2$, MSi and so on, and thus the quantity of Si in the molten metal is not so excessive that crystalline silicon is preferentially precipitated. Therefore, by employing the composition of the molten metal satisfying the condition of the present invention, the $CaSi_2$-containing composition of the present invention having been subjected to the cooling step contains no crystalline silicon, or a slight amount of crystalline silicon if any.

The molten metal step is described.

Crude $CaSi_2$ contains at least Ca and Si, and the crude $CaSi_2$ may also contain M within the condition that allows existence of crystalline silicon. The crude $CaSi_2$ may contain inevitable impurities and other elements without departing from the gist of the present invention.

Crude $CaSi_2$, Ca and/or M may be separately molten and then mixed to prepare a molten metal, or two of crude $CaSi_2$, Ca and/or M may be mixed and molten, and then the remaining one of crude $CaSi_2$, Ca and/or M may be mixed to prepare a molten metal, or three of crude $CaSi_2$, Ca and/or M may be mixed and molten. Ca has a melting point of 842° C., $CaSi_2$ has a melting point of about 1000° C., Si has a melting point of 1410° C., and M has a melting point of higher than the melting points of Ca and Si. Since Ca has a boiling point of 1484° C., a molten metal is preferably prepared by mixing Ca after melting $CaSi_2$, Si and M so as to prevent Ca from scattering.

The heating temperature may be a temperature that allows a molten metal to be obtained. Since $CaSi_2$ has a melting point of about 1000° C., the heating temperature is preferably in a range of 1000° C. to 1500° C., more preferably in a range of 1050° C. to 1450° C., further preferably in a range of 1100° C. to 1400° C. In a system containing $CaSi_2$, Ca, M and Si, a molten metal is considered to be generated, for example, in the following mechanism.

Si and M dissolve in molten $CaSi_2$ to produce a molten metal.

Ca disperses in solid Si and solid M in molten $CaSi_2$, and the melting points of Si and M gradually decrease to produce a molten metal.

Si disperses in solid M, and the melting point of M gradually decreases to produce a molten metal.

Therefore, in the molten metal step, a heating temperature of not less than melting points of respective simple substances of M and Si is not considered to be necessarily required.

Examples of a heating device that is used in the molten metal step include a high-frequency induction heating device, an electric furnace, and a gas furnace. The molten metal step may be conducted under a pressurizing or reduced pressure condition, or may be conducted in an atmosphere of an inert gas such as argon.

Next, the cooling step is described.

Cooling the molten metal results in precipitation of $MSi_a$ and layered $CaSi_2$. In the $CaSi_2$-containing composition of the present invention, $MSi_a$ exists in a $CaSi_2$ matrix. The cooling speed is not particularly limited. The molten metal may be cooled by pouring the molten metal into a predetermined mold. The composition ratio of the $CaSi_2$-containing composition of the present invention corresponds to the composition ratio of the molten metal. The molar ratio of Ca, M and Si contained in the $CaSi_2$-containing composition of the present invention is equal to the molar ratio defined by the condition of the present invention.

The significance of the condition of the present invention is further described.

Apart from the condition of the present invention, if $x\leq23$ or $z>200/3$, for example, crystalline silicon is occasionally precipitated preferentially. If $x>100/3$ or $z\leq64$, large quantity of CaSi that is difficult to handle is occasionally precipitated preferentially.

If $y\geq10$, the quantity of $MSi_a$ contained in the $CaSi_2$-containing composition is large. In the case where the later-described silicon material is used as a negative electrode active material of a secondary battery, the capacity of the secondary battery may decrease because $MSi_a$ itself has weak or no activity as an active material.

Examples of the preferred range of the condition of the present invention include the ranges of x, y and z: $25<x\leq100/3$, $28<x\leq100/3$ or $30<x\leq100/3$, $0<y<7$, $0<y<5$ or $0<y<3$, $65<z\leq200/3$, and $66<z\leq200/3$ or $65<z<66$.

For example, when $MSi_a$ is MSi and $MSi_2$, the ranges such as $x+y\leq z\leq2x+2y$, and $x+y\leq z\leq2x+y$ are defined in addition to the condition of the present invention.

The $CaSi_2$-containing composition of the present invention may be ground or further classified.

The $CaSi_2$-containing composition of the present invention is used as a raw material for a later-described layered silicon compound or silicon material. The layered silicon compound or the silicon material is used as a negative electrode active material of a power storage device such as a secondary battery.

The layered silicon compound is produced through a step of reacting the $CaSi_2$-containing composition of the present invention with acid to obtain a layered silicon compound. In this step, in the layered $CaSi_2$ constituting the $CaSi_2$-containing composition of the present invention, Si forms a Si—H bond while Ca is substituted by H of the acid. The layered silicon compound is in a layered form because the basic backbone of a Si layer by $CaSi_2$ which is a raw material is maintained.

Examples of the acid include hydrofluoric acid, hydrochloric acid, hydrobromic acid, hydroiodic acid, sulfuric acid, nitric acid, phosphoric acid, formic acid, acetic acid, methanesulfonic acid, tetrafluoroboric acid, hexafluorophosphoric acid, hexafluoroarsenic acid, fluoroantimonic acid, hexafluorosilicic acid, hexafluorogermanic acid, hexafluorostannic (IV) acid, trifluoroacetic acid, hexafluorotitanic acid, hexafluorozirconic acid, trifluoromethanesulfonic acid, and fluorosulfonic acid. These acids may be used singly or in combination.

In particular, use of an acid that causes a fluorine anion as the acid is occasionally preferred. By employing such acid, a Si—O bond and a bond between Si and anion of other acid (for example, Si—Cl bond in the case of hydrochloric acid) that possibly occur in the layered silicon compound are reduced. If a Si—O bond or a Si—Cl bond exists in the layered silicon compound, the Si—O bond or the Si—Cl bond occasionally exists in the silicon material even after the next step. In a lithium ion secondary battery in which a silicon material having a Si—O bond or a Si—Cl bond is used as a negative electrode active material, the Si—O bond or the Si—Cl bond is assumed to inhibit movement of lithium ions.

In the step of obtaining a layered silicon compound, the acid may be used in such an amount that supplies protons of not less than 2 equivalents to $CaSi_2$ contained in the $CaSi_2$-containing composition of the present invention. While the step may be conducted in the absence of a solvent, use of water as a solvent is preferred from the view point of separation of the target substance and removal of a secondary product such as $CaCl_2$. As the reaction condition of the step, a reduced pressure condition such as in vacuum, or an inert gas atmosphere condition is preferred, and a temperature condition of not higher than room temperature such as in an ice bath is preferred. The reaction time of the step is appropriately set.

The chemical reaction of the step of obtaining a layered silicon compound in the case of using hydrochloric acid as the acid is represented by the following ideal reaction formula. $MSi_a$ contained in the $CaSi_2$-containing composition of the present invention is not concerned with the following reaction formula because the $MSi_a$ does not change in this step.

$$3CaSi_2 + 6HCl \rightarrow Si_6H_6 + 3CaCl_2$$

In the above reaction formula, $Si_6H_6$ corresponds to an ideal layered silicon compound.

The step of obtaining a layered silicon compound is preferably conducted in the presence of water, and $Si_6H_6$ reacts with water. Thus, normally, the layered silicon compound is rarely obtained as compounds of $MSi_a$ and $Si_6H_6$ by themselves, but contains oxygen or an element derived from acid.

Following the step of obtaining a layered silicon compound, preferably, a filtering step of collecting the layered silicon compound by filtration, a washing step of washing the layered silicon compound, and a drying step of drying the layered silicon compound are appropriately conducted if necessary.

Next, the heating step of heating the layered silicon compound at not less than 300° C. is described. In the step, the layered silicon compound is heated at not less than 300° C. to make hydrogen, water or the like leave, and thus a silicon material (hereinafter, also referred to as a silicon material of the present invention) is obtained. An ideal reaction formula of the chemical reaction of this step is as follows. $MSi_a$ is not concerned with the following reaction formula because the $MSi_a$ does not change also in this step.

$$Si_6H_6 \rightarrow 6Si + 3H_2\uparrow$$

Since the layered silicon compound that is actually used in the heating step contains oxygen or an element derived from acid, and further contains inevitable impurities, the silicon material that is actually obtained also contains oxygen or an element derived from acid, and further contains inevitable impurities.

Preferably, the heating step is conducted in a non-oxidative atmosphere containing less oxygen than under a normal atmosphere. Examples of the non-oxidative atmosphere include a reduced pressure atmosphere including vacuum, and an inert gas atmosphere. The heating temperature is preferably in a range of 350° C. to 1100° C., more preferably in a range of 400° C. to 1000° C. If the heating temperature is too low, removal of hydrogen is occasionally insufficient, whereas if the heating temperature is too high, the energy is wasted. The heating time is appropriately set in accordance with the heating temperature. Preferably, the heating time is determined while the amount of hydrogen coming off the reaction system is measured. By appropriately selecting the heating temperature and the heating time, the ratio between amorphous silicon and silicon crystallite contained in the silicon material to be produced, and the size of the silicon crystallite are adjusted. By appropriately selecting the heating temperature and the heating time, the form of the layer having a thickness in a nano level including amorphous silicon and silicon crystallite contained in the silicon material to be produced are adjusted.

The obtained silicon material may be ground or further classified.

As the size of the silicon crystallite, nano size is preferred. Specifically, the silicon crystallite size is preferably in a range of 0.5 nm to 300 nm, more preferably in a range of 1 nm to 100 nm, further preferably in a range of 1 nm to 50 nm, particularly preferably in a range of 1 nm to 10 nm. The silicon crystallite size is determined by subjecting the silicon material to an X-ray diffraction measurement (XRD measurement), and calculation by the Scherrer's equation using a half width of a diffraction peak in Si (111) plane of the obtained XRD chart. The silicon crystallite described here means the one observed as a broad peak in an XRD chart, and is distinguished from the already described crystalline silicon in the peak forms thereof.

By the heating step described above, a silicon material having a structure made up of a plurality of plate-like silicon bodies laminated in the thickness direction is obtained. This structure is confirmed by observation with a scanning electron microscope (hereinafter, occasionally abbreviated to SEM) or the like. In consideration of using the silicon material as an active material of a lithium ion secondary battery, the plate-like silicon body has a thickness preferably in a range of 10 nm to 100 nm, more preferably in a range of 20 nm to 50 nm for efficient insertion and elimination reaction of lithium ion. The plate-like silicon body has a length in the longitudinal direction preferably in a range of 0.1 μm to 50 μm. Regarding the plate-like silicon body, (length in the longitudinal direction)/(thickness) preferably falls in a range of 2 to 1000. The plate-like silicon body is preferably in such a condition that silicon crystallite is scattered in a matrix of amorphous silicon.

Also by mixing the $CaSi_2$-containing composition of the present invention and a halogen-containing polymer, and heating the mixture at a temperature not less than the carbonization temperature of the halogen-containing polymer, the silicon material of the present invention is produced. Hereinafter, the production method is also referred to as a "halogen-containing polymer method". In the halogen-containing polymer method, the silicon material of the present invention is produced in a carbon-coated state (hereinafter, also referred to as a "carbon-coated silicon material").

A reaction mechanism of the halogen-containing polymer method in the case of using polyvinyl chloride as a halogen-containing polymer is described below.

By heating, the polyvinyl chloride is decomposed to release hydrogen chloride.

$$-(CH_2CHCl)n\text{-} \rightarrow nHCl + -(CH=CH)n\text{-}$$

Then, $CaSi_2$ reacts with the released hydrogen chloride to produce a layered silicon compound represented by $Si_6H_6$.

$$3CaSi_2 + 6HCl \rightarrow Si_6H_6 + 3CaCl_2$$

Under the heating, hydrogen in $Si_6H_6$ is removed, and silicon is obtained.

$$Si_6H_6 \rightarrow 6Si + 3H_2\uparrow$$

Further, (CH=CH)n which is a decomposition product of polyvinyl chloride carbonizes under the heating condition at a temperature of not less than the carbonization temperature of (CH=CH)n. Since silicon and a carbide of (CH=CH)n coexist at this time, a carbon-coated silicon material in which silicon and carbon are integrated is obtained.

$$Si + (CH=CH)n \rightarrow \text{carbon-coated } Si + nH_2\uparrow$$

Hereinafter, the halogen-containing polymer method is specifically described.

The halogen-containing polymer may be a polymer that contains halogen in a chemical structure. The reason is as follows. Under the heating condition of the halogen-containing polymer method, hydrohalic acid and/or a halogen molecule is removed from the halogen-containing polymer. Then, negatively charged halogen that constitutes the hydrohalic acid or halogen molecule reacts with Ca of $CaSi_2$. That is, the halogen-containing polymer, which serves as a source of negatively charged halogen, allows proceeding of a desired reaction. When $CaSi_2$ reacts with hydrohalic acid, $Si_6H_6$ and calcium halide are considered to be generated at first, whereas when $CaSi_2$ reacts with a halogen molecule, silicon halide and calcium halide are considered to be generated at first.

Examples of the halogen-containing polymer include those having a monomer unit represented by general formula (1).

GENERAL FORMULA (1)

($R^1$ represents a hydrocarbon group having a valence of 3 or greater. Each X is independently a halogen. n represents an integer of not less than 1.)

Hydrocarbon includes saturated hydrocarbon and unsaturated hydrocarbon. Saturated hydrocarbon includes linear saturated hydrocarbon and cyclic saturated hydrocarbon. Unsaturated hydrocarbon includes linear unsaturated hydrocarbon and cyclic unsaturated hydrocarbon.

In the chemical structure of $R^1$, a chemical structure which forms a main chain of a monomer unit (chemical structure containing carbon involved in polymerization reaction) may be any of linear saturated hydrocarbon, cyclic saturated hydrocarbon, linear unsaturated hydrocarbon and cyclic unsaturated hydrocarbon. Specific examples of the chemical structure which is a main chain of a monomer unit include CH, $CH_2$—CH, CH=CH, a cyclohexane ring, and a benzene ring.

In the chemical structure of $R^1$, a chemical structure which binds with a main chain of a monomer unit (hereinafter, also referred to as a sub chain) may be any of hydrogen, linear saturated hydrocarbon, cyclic saturated hydrocarbon, linear unsaturated hydrocarbon and cyclic unsaturated hydrocarbon. Hydrogen in each hydrocarbon may be substituted with other element or other hydrocarbon.

X represents either of fluorine, chlorine, bromine or iodine. When n is not less than 2, each X may be the same element or different elements. X may directly bind with carbon which forms a main chain of a monomer unit, or may bind with carbon of a sub chain. The upper limit of the number of n is determined by the chemical structure of $R^1$.

The halogen-containing polymer may be formed by a single type of monomer unit represented by the general formula (1), or may be formed by multiple types of monomer units represented by the general formula (1). The halogen-containing polymer may be formed by a monomer unit represented by the general formula (1) and a monomer unit having another chemical structure.

Here, by employing a halogen-containing polymer in which mass % of halogen is large, the desired reaction is considered to proceed more efficiently. Therefore, the halogen-containing polymer is preferably formed by only monomer units represented by the general formula (1).

The molecular weight of the halogen-containing polymer is preferably in a range of 1000 to 1000000, more preferably in a range of 1000 to 500000, further preferably in a range of 3000 to 100000 by number average molecular weight. The halogen-containing polymer expressed by the degree of polymerization is preferably in a range of 5 to 100000, more preferably in a range of 10 to 50000, further preferably in a range of 100 to 10000.

Among the monomer units represented by the general formula (1), preferred monomer units are represented by the following general formula (2).

GENERAL FORMULA (2)

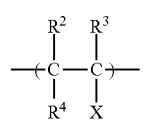

($R^2$, $R^3$, and $R^4$ are each independently selected from a monovalent hydrocarbon group, a halogen-substituted hydrocarbon group, hydrogen or halogen. X represents a halogen.)

Description for hydrocarbon and halogen is as above. Examples of a preferred hydrocarbon in the general formula (2) include alkyl groups having 1 to 6 carbons, a vinyl group, and a phenyl group.

As described above, those containing a large mass % of halogen are considered to be preferred as the halogen-containing polymer, and thus, preferably, $R^2$, $R^3$, and $R^4$ in a monomer unit of the general formula (2) each independently represent hydrogen or halogen.

Particularly preferred examples of the halogen-containing polymer include polyvinylidene fluoride, polyvinyl fluoride, polyvinylidene chloride, and polyvinyl chloride.

Regarding the use amounts of the $CaSi_2$-containing composition of the present invention and the halogen-containing polymer, the halogen-containing polymer is preferably used in such an amount that the molar ratio of halogen relative to Ca of the $CaSi_2$-containing composition that is used is not less than 2.

The heating temperature of the halogen-containing polymer method is a temperature not less than the carbonization temperature of the halogen-containing polymer. In general, organic compounds carbonize at around 400° C. The higher the heating temperature, the higher conductivity the obtained carbide has. Therefore, the heating temperature of the halogen-containing polymer method is preferably in a range of 400 to 1500° C., more preferably in a range of 500 to 1300° C., further preferably in a range of 600 to 1200° C. By the heating temperature, the ratio between the amorphous silicon and the silicon crystallite contained in the carbon-coated silicon material, and the size of the silicon crystallite are adjusted, and further, the form and the size of the layer having a thickness in a nano level including amorphous silicon and silicon crystallite that are contained in the carbon-coated silicon material to be produced are adjusted.

The silicon crystallite size is preferably in a range of 0.5 nm to 300 nm, more preferably in a range of 1 nm to 100 nm, further preferably in a range of 1 nm to 50 nm, particularly preferably in a range of 1 nm to 10 nm. The silicon crystallite size is determined by subjecting the carbon-coated silicon material to an X-ray diffraction measurement (XRD measurement), and calculation by the Scherrer's equation using a half width of a diffraction peak in Si (111) plane of the obtained XRD chart. The silicon crystallite described here means the one observed as a broad peak in an XRD chart, and is distinguished from the already described crystalline silicon in the peak forms thereof.

By the halogen-containing polymer method, a carbon-coated silicon material having a structure made up of a plurality of plate-like silicon bodies laminated in the thickness direction is obtained. This structure is confirmed by observation with an SEM or the like. In consideration of using the carbon-coated silicon material as an active material of a lithium ion secondary battery, the plate-like silicon body has a thickness preferably in a range of 10 nm to 100 nm, more preferably in a range of 20 nm to 50 nm for efficient insertion and elimination reaction of lithium ion. The plate-like silicon body has a length in the longitudinal direction preferably in a range of 0.1 μm to 50 μm. Regarding the plate-like silicon body, (length in the longitudinal direction)/(thickness) preferably falls in a range of 2 to 1000. The plate-like silicon body is preferably in such a condition that silicon crystallite is scattered in a matrix of amorphous silicon.

In the halogen-containing polymer method, the heating condition may be a multistep heating condition having two or more steps including a step of heating at a temperature of not less than the decomposition temperature of the halogen-containing polymer, and a step of heating at a temperature of not less than the carbonization temperature of the polymer after decomposition. Here, the decomposition temperature of the halogen-containing polymer means a temperature at which hydrohalic acid or a halogen molecule is removed from the halogen-containing polymer.

Further, in the halogen-containing polymer method, the heating condition may be a multistep heating condition having three or more steps including a step of heating at a temperature of not less than the melting point or the glass transition point of the halogen-containing polymer, a step of heating at a temperature of not less than the decomposition temperature of the halogen-containing polymer, and a step of heating at a temperature of not less than the carbonization temperature of the polymer after decomposition.

Taking polyvinyl chloride for example, polyvinyl chloride has a melting point of approximately within a range of 85 to 210° C., and polyvinyl chloride has a decomposition temperature, namely a hydrogen chloride generating temperature, of approximately within a range of 210 to 300° C. Thus, when polyvinyl chloride is employed as the halogen-containing polymer in the halogen-containing polymer method, the heating condition may be a three-step heating condition including a first heating step of heating at around 200° C., a second heating step of heating at around 300° C., and a third heating step of heating around 900° C. Through the first heating step, $CaSi_2$ is assumed to be uniformly dispersed in a matrix of the polyvinyl chloride. Then through the second heating step, the conversion rate of $CaSi_2$ into $Si_6H_6$ and Si is assumed to increase because the $CaSi_2$ in a suitable dispersed condition reacts with HCl efficiently. Finally through the third heating step, the final conversion rate of $CaSi_2$ into Si is assumed to increase, the quantity of silicon crystal in the silicon material is assumed to increase, and a carbon-coated silicon material in which more uniform carbon coating is made for the silicon material is assumed to be obtained.

The halogen-containing polymer method is preferably conducted in an atmosphere of inert gas such as argon, helium or nitrogen gas.

The carbon-coated silicon material obtained by the halogen-containing polymer method may be made into particles having a certain particle size distribution through grinding or classification. Examples of a preferred particle size distribution of the carbon-coated silicon material include D50, measured by a general laser diffraction type particle size distribution measuring device, within a range of 1 to 30 μm.

The carbon-coated silicon material obtained by the halogen-containing polymer method is preferably subjected to a washing step of washing with a solvent having a relative permittivity of not less than 5. The washing step is a step of removing unnecessary components adhered to the carbon-coated silicon material by washing with a solvent having a relative permittivity of not less than 5 (hereinafter also referred to as a "washing solvent"). The step is conducted for the purpose of removing a salt such as calcium halide that is dissoluble in the washing solvent. For example, when polyvinyl chloride is used as a halogen-containing polymer, $CaCl_2$ is assumed to remain in the carbon-coated silicon material. Thus, by washing the carbon-coated silicon material with the washing solvent, unnecessary components including $CaCl_2$ are dissolved in the washing solvent, and removed. The washing step may be a method of dipping the carbon-coated silicon material in the washing solvent, or a method of pouring the washing solvent to the carbon-coated silicon material.

As the washing solvent, those having a higher relative permittivity are preferred from the view point of dissolubility of a salt, and those having a relative permittivity of not less than 10 or not less than 15 are presented as more preferred washing solvents. As the range of the relative permittivity of the washing solvent, a range of 5 to 90 is preferred, a range of 10 to 90 is more preferred, and a range of 15 to 90 is further preferred. As the washing solvent, a single solvent may be used, or a mixed solvent of a plurality of solvents may be used.

Specific examples of the washing solvent include water, methanol, ethanol, n-propanol, i-propanol, n-butanol, i-butanol, sec-butanol, tert-butanol, ethylene glycol, glycerin, N-methyl-2-pyrrolidone, N,N-dimethylformamide, N,N-dimethylacetamide, dimethylsulfoxide, acetonitrile, ethylene carbonate, propylene carbonate, benzyl alcohol, phenol, pyridine, tetrahydrofuran, acetone, ethyl acetate, and dichloromethane. As the washing solvent, those in which part or all of hydrogens in the chemical structure of these specific solvents are substituted by fluorine may be employed. Water used as the washing solvent is preferably any of distilled water, water having passed through a reverse osmosis membrane, or deionized water.

For reference, relative permittivities of various solvents are shown in Table 1.

TABLE 1

| Solvent | Relative permittivity |
|---|---|
| water | 80 |
| methanol | 33 |
| ethanol | 24 |
| n-propanol | 20 |
| i-propanol | 18 |
| n-butanol | 18 |
| ethylene glycol | 39 |
| glycerin | 43 |
| N-methyl-2-pyrrolidone | 32 |
| N,N-dimethylformamide | 38 |
| dimethylsulfoxide | 47 |
| acetonitrile | 37 |
| ethylene carbonate | 90 |
| propylene carbonate | 64 |
| benzyl alcohol | 13 |
| phenol | 9.8 |
| pyridine | 12 |
| acetone | 21 |
| dichloromethane | 9 |
| tetrahydrofuran | 7.5 |
| ethyl acetate | 6 |
| The following are solvents having a relative permittivity of less than 5. | |
| dimethyl carbonate | 3 |
| diethyl carbonate | 3 |
| ethylmethyl carbonate | 3 |
| benzene | 2 |
| cyclohexane | 2 |
| diethyl ether | 4 |

Particularly preferred examples of the washing solvent include water, methanol, ethanol, n-propanol, i-propanol, n-butanol, i-butanol, sec-butanol, tert-butanol, and acetone.

After the washing step, preferably, the washing solvent is removed from the carbon-coated silicon material by filtration and drying.

The washing step may be repeated plural times. In such a case, the washing solvent may be changed. For example, by selecting water having an extremely high relative permittivity as the washing solvent of the first-time washing step, and using ethanol or acetone that is compatible with water and has a low boiling point as the washing solvent of the next-time washing step, the water is removed efficiently, and the washing solvent is easily prevented from remaining.

The drying step after the washing step is conducted preferably in a reduced-pressure environment, and further preferably at a temperature higher than the boiling point of the washing solvent. As the temperature, 80° C. to 110° C. is preferred.

The silicon material of the present invention is used as a negative electrode active material of power storage devices including secondary batteries such as a lithium ion secondary battery, an electric double layer capacitor, and a lithium ion capacitor. The silicon material of the present invention is also used, for example, as materials for CMOS, semiconductor memory and solar battery, or as photocatalyst materials.

The lithium ion secondary battery of the present invention has the silicon material of the present invention as a negative electrode active material. Specifically, the lithium ion secondary battery of the present invention includes a positive electrode, a negative electrode having the silicon material of the present invention as a negative electrode active material, an electrolytic solution, and a separator.

The positive electrode has a current collector, and a positive electrode active material layer bound to the surface of the current collector.

The current collector refers to an electronic conductor that is chemically inert for continuously sending a flow of current to the electrode during discharging or charging of the lithium ion secondary battery. Examples of the current collector include at least one selected from silver, copper, gold, aluminum, tungsten, cobalt, zinc, nickel, iron, platinum, tin, indium, titanium, ruthenium, tantalum, chromium, or molybdenum, and metal materials such as stainless steel. The current collector may be coated with a known protective layer. One obtained by treating the surface of the current collector with a known method may be used as the current collector.

The current collector takes forms such as a foil, a sheet, a film, a line shape, a bar shape, and a mesh. Thus, as the current collector, for example, metal foils such as copper foil, nickel foil, aluminum foil, and stainless steel foil are suitably used. When the current collector is in the form of a foil, a sheet, or a film, the thickness thereof is preferably in a range of 1 μm to 100 μm.

The positive electrode active material layer includes a positive electrode active material, and, if necessary, a conductive additive and/or a binding agent.

Examples of the positive electrode active material include layered compounds that are $Li_aNi_bCO_cMn_dD_eO_f$ (0.2≤a≤2, b+c+d+e=1, 0≤e<1; D is at least one element selected from Li, Fe, Cr, Cu, Zn, Ca, Mg, S, Si, Na, K, Al, Zr, Ti, P, Ga, Ge, V, Mo, Nb, W, or La; 1.7≤f≤3) and $Li_2MnO_3$. Additional examples of the positive electrode active material include a spinel such as $LiMn_2O_4$, a solid solution formed from a mixture of a spinel and a layered compound, and polyanion-based compounds represented by $LiMPO_4$, $LiMVO_4$, $Li_2MSiO_4$ (where "M" is selected from at least one of Co, Ni, Mn, or Fe), or the like. Further additional examples of the positive electrode active material include favorite-based compounds represented by $LiMPO_4F$ ("M" is a transition metal) such as $LiFePO_4F$ and borate-based compounds represented by $LiMBO_3$ ("M" is a transition metal) such as $LiFeBO_3$. Any metal oxide used as the positive electrode active material has a basic composition of the composition formulae described above, and those in which a metal element included in the basic composition is substituted with another metal element are also used as the positive electrode active material. In addition, as the positive electrode active material, a material for the positive electrode active material not containing lithium ion contributing to the charging and discharging, such as, for example, elemental substance sulfur, a compound that is a composite of sulfur and carbon, metal sulfides such as $TiS_2$, oxides such as $V_2O_5$ and $MnO_2$, polyaniline and anthraquinone and compounds containing such aromatics in the chemical structure, conjugate-based materials such as conjugate diacetic acid-based organic matters, and other known materials, may be used. Furthermore, a compound having a stable radical such as nitroxide, nitronyl nitroxide, galvinoxyl, and phenoxyl may be used as the positive electrode active material. When a material for the positive electrode active material not containing lithium is used, an ion has to be added in advance to the positive electrode and/or the negative electrode using a known method. For adding the ion, metal or a compound containing the ion may be used.

The conductive additive is added for increasing conductivity of the electrode. Thus, the conductive additive is preferably added optionally when conductivity of the electrode is insufficient, and may not be added when conductivity of the electrode is sufficiently good. As the conductive additive, a fine electron conductor that is chemically inert may be used, and examples thereof include carbonaceous fine particles such as carbon black, graphite, vapor grown carbon fiber (VGCF) and various metal particles. Examples of the carbon black include acetylene black, Ketchen black (registered trademark), furnace black, and channel black. These conductive additives may be added to the active material layer singly or in combination of two or more types of these conductive additives.

The blending ratio of the conductive additive in the active material layer in mass ratio, i.e., active material:conductive additive, is preferably 1:0.005 to 1:0.5, more preferably 1:0.01 to 1:0.2, further preferably 1:0.03 to 1:0.1. The reason is that if the conductive additive is too little, efficient conducting paths are not formed, whereas if the conductive additive is too much, moldability of the active material layer deteriorates and energy density of the electrode becomes low.

The binding agent serves to adhere the active material, the conductive additive or the like to the surface of the current collector, and maintain the conductive network in the electrode. Examples of the binding agent include a fluorine-containing resin such as polyvinylidene fluoride, polytetrafluoroethylene, or fluororubber, a thermoplastic resin such as polypropylene or polyethylene, an imide-based resin such as polyimide or polyamide-imide, an alkoxysilyl group-containing resin, an acrylic resin such as poly(meth)acrylic acid, styrene-butadiene rubber (SBR), carboxymethyl cellulose, an alginate such as sodium alginate or ammonium alginate, a water-soluble cellulose ester crosslinked product, and starch-acrylic acid graft polymer. These binding agents may be employed singly or in plurality.

The blending ratio of the binding agent in the active material layer in mass ratio: active material:binding agent, is preferably 1:0.001 to 1:0.3, more preferably 1:0.005 to 1:0.2, further preferably 1:0.01 to 1:0.15. The reason is that if the binding agent is too little, the moldability of the electrode deteriorates, whereas if the binding agent is too much, energy density of the electrode becomes low.

The negative electrode has a current collector, and a negative electrode active material layer bound to the surface of the current collector. Regarding the current collector, those described for the positive electrode may be appropriately and suitably employed. The negative electrode active material layer includes a negative electrode active material, and, if necessary, a conductive additive and/or a binding agent.

As the negative electrode active material, the silicon material of the present invention may be used, only the silicon material of the present invention may be used, or a combination of the silicon material of the present invention and a known negative electrode active material may be used. The silicon material of the present invention covered with carbon may be used as the negative electrode active material.

Regarding the conductive additive and the binding agent to be used in the negative electrode, those described for the positive electrode may be appropriately and suitably employed in the blending ratio as described above.

In order to form the active material layer on the surface of the current collector, the active material may be applied on the surface of the current collector using a known conventional method such as a roll coating method, a die coating method, a dip coating method, a doctor blade method, a spray coating method, and a curtain coating method. Specifically, an active material, a solvent, and if necessary, a binding agent and/or a conductive additive are mixed to prepare a slurry. Examples of the solvent include N-methyl-2-pyrrolidone, methanol, methyl isobutyl ketone, and water. The slurry is applied on the surface of the current collector, and then dried. In order to increase the electrode density, compression may be performed after drying.

The electrolytic solution contains a nonaqueous solvent and an electrolyte dissolved in the nonaqueous solvent.

Examples of the nonaqueous solvent include cyclic esters, linear esters, and ethers. Examples of the cyclic esters include ethylene carbonate, propylene carbonate, butylene carbonate, gamma butyrolactone, vinylene carbonate, 2-methyl-gamma butyrolactone, acetyl-gamma butyrolactone, and gamma valerolactone. Examples of the linear esters include dimethyl carbonate, diethyl carbonate, dibutyl carbonate, dipropyl carbonate, ethylmethyl carbonate, propionic acid alkylesters, malonic acid dialkylesters, and acetic acid alkylesters. Examples of the ethers include tetrahydrofuran, 2-methyltetrahydrofuran, 1,4-dioxane, 1,2-dimethoxyethane, 1,2-diethoxyethane, and 1,2-dibutoxyethane. As a nonaqueous solvent, compounds in which part or all of hydrogens in the chemical structure of the specific solvents are substituted by fluorine may be employed.

Examples of the electrolyte include lithium salts such as $LiClO_4$, $LiAsF_6$, $LiPF_6$, $LiBF_4$, $LiCF_3SO_3$, and $LiN(CF_3SO_2)_2$.

Examples of the electrolytic solution include solutions prepared by dissolving a lithium salt such as $LiClO_4$, $LiPF_6$, $LiBF_4$, or $LiCF_3SO_3$ in a nonaqueous solvent such as ethylene carbonate, dimethyl carbonate, propylene carbonate, or diethyl carbonate in a concentration of about 0.5 mol/L to 1.7 mol/L.

The separator is for separating the positive electrode and the negative electrode to allow passage of lithium ions while preventing short circuit due to a contact of both electrodes. Examples of the separator include porous materials, non-woven fabrics, and woven fabrics using one or more types of materials having electrical insulation property such as: synthetic resins such as polytetrafluoroethylene, polypropylene, polyethylene, polyimide, polyamide, polyaramide (aromatic polyamide), polyester, and polyacrylonitrile; polysaccharides such as cellulose and amylose; natural polymers such as fibroin, keratin, lignin, and suberin; and ceramics. In addition, the separator may have a multilayer structure.

Next, a method for producing a lithium ion secondary battery is described.

An electrode assembly is formed from the positive electrode, the negative electrode, and, if necessary, the separator interposed therebetween. The electrode assembly may be a laminated type obtained by stacking the positive electrode, the separator, and the negative electrode, or a wound type obtained by winding the positive electrode, the separator, and the negative electrode. The lithium ion secondary battery is preferably formed by respectively connecting, using current collecting leads or the like, the positive electrode current collector to a positive electrode external connection terminal and the negative electrode current collector to a negative electrode external connection terminal, and then adding the electrolytic solution to the electrode assembly. In addition, the lithium ion secondary battery of the present invention preferably executes charging and discharging in a voltage range suitable for the types of the active materials contained in the electrodes.

The form of the lithium ion secondary battery of the present invention is not limited in particular, and various forms such as a cylindrical type, a square type, a coin type, a laminated type, etc., are employed.

The lithium ion secondary battery of the present invention may be mounted on a vehicle. The vehicle may be a vehicle that uses, as all or a part of the source of power, electrical energy obtained from the lithium ion secondary battery, and examples thereof include electric vehicles and hybrid vehicles. When the lithium ion secondary battery is to be mounted on the vehicle, a plurality of the lithium ion secondary batteries may be connected in series to form an assembled battery. Other than the vehicles, examples of instruments on which the lithium ion secondary battery may be mounted include various home appliances, office instruments, and industrial instruments driven by a battery such as personal computers and portable communication devices. In addition, the lithium ion secondary battery of the present invention may be used as power storage devices and power smoothing devices for wind power generation, photovoltaic power generation, hydroelectric power generation, and other power systems, power supply sources for auxiliary machineries and/or power of ships, etc., power supply sources for auxiliary machineries and/or power of aircraft and spacecraft, etc., auxiliary power supply for vehicles that do not use electricity as a source of power, power supply for movable household robots, power supply for system backup, power supply for uninterruptible power supply devices, and power storage devices for temporarily storing power required for charging at charge stations for electric vehicles.

Although embodiments of the present invention have been described above, the present invention is not limited to the embodiments. Without departing from the gist of the present invention, the present invention is implemented in various modes with modifications and improvements, etc., that are made by a person skilled in the art.

EXAMPLES

In the following, the present invention is specifically described by presenting Examples, Comparative Examples and so on. The present invention is not limited to these Examples.

Example 1

A $CaSi_2$-containing composition of Example 1, a layered silicon compound of Example 1, a silicon material of Example 1, and a lithium ion secondary battery of Example 1 were produced in the following manner.

Molten Metal Step

A crude $CaSi_2$ containing crystalline silicon and Fe was prepared. In the crude $CaSi_2$, a mass ratio of Ca, Fe and Si was 33.6:5.3:61.2, and a molar ratio of Ca, Fe and Si was 26.94:3.05:70.01.

In a carbon crucible, 20 g of the crude $CaSi_2$ was placed. The carbon crucible was placed in a high-frequency induction heating device, and heated at 1150° C. in an argon gas atmosphere to melt the crude $CaSi_2$. To the molten crude $CaSi_2$, 1.5 g of Ca was added to obtain a molten metal. In the molten metal, a mass ratio of Ca, Fe and Si was 37.1:4.8:55.3, and a molar ratio of Ca, Fe and Si was 31.06:2.88:66.06.

Cooling Step

The molten metal was poured into a mold and allowed to cool, and thus a solid $CaSi_2$-containing composition was obtained. The solid $CaSi_2$-containing composition was ground in a mortar, and caused to pass through a sieve having an aperture of 53 μm. The powdery $CaSi_2$-containing composition having passed through the sieve having an aperture of 53 μm was used as a $CaSi_2$-containing composition of Example 1.

Step of Obtaining Layered Silicon Compound

In 100 mL of a 35 mass % HCl aqueous solution in an ice bath, 5 g of the $CaSi_2$-containing composition of Example 1 was added in an argon gas atmosphere, and stirred for 90 minutes. Dispersion of dark green powder into the reaction liquid was observed. The reaction liquid was filtered, and the residue was washed with distilled water and acetone, and further dried in a vacuum at room temperature for 12 hours, to obtain a layered silicon compound of Example 1.

Step of Obtaining Silicon Material

The layered silicon compound of Example 1 was heated for 1 hour at 900° C. in an argon gas atmosphere, to obtain a silicon material of Example 1.

Step of Producing Lithium Ion Secondary Battery

The silicon material of Example 1 was ground, and coated with carbon, and then washed with water to produce a carbon-coated silicon material of Example 1.

A slurry was prepared by mixing 75 parts by mass of the carbon-coated silicon material of Example 1 as the negative electrode active material, 10 parts by mass of graphite as the negative electrode active material, 10 parts by mass of polyamide imide as the binding agent, 5 parts by mass of acetylene black as the conductive additive, and an appropriate amount of N-methyl-2-pyrrolidone.

As the current collector, an electrolytic copper foil having a thickness of 20 μm was prepared. On the surface of the copper foil, the aforementioned slurry was applied in a film form by using a doctor blade. The copper foil on which the slurry was applied was dried for 20 minutes at 80° C. to remove N-methyl-2-pyrrolidone by volatilization, and thus a copper foil having a negative electrode active material layer formed on the surface of the foil was obtained. The copper foil was then compressed by using a roll pressing machine so that the thickness of the negative electrode active material layer was 20 μm to obtain a joined object. The obtained joined object was heated and dried for 2 hours in a vacuum at 200° C. to obtain an electrode.

The electrode was cut to have a diameter of 11 mm to obtain an evaluation electrode. A metal lithium foil was cut to have a diameter of 13 mm to obtain a counter electrode. As the separator, a glass filter (Hoechst Celanese) and Celgard 2400 (Polypore Inc.) which is a monolayer polypropylene were prepared. In a solvent prepared by mixing 50 parts by volume of ethylene carbonate, and 50 parts by volume of diethyl carbonate, $LiPF_6$ was dissolved in 1 mol/L to prepare an electrolytic solution. Two types of separators were sandwiched between the counter electrode and the evaluation electrode in the sequence of the counter electrode, the glass filter, Celgard 2400, and the evaluation electrode to obtain an electrode assembly. The electrode assembly was housed in a coin type battery case CR2032 (Hohsen Corp.), and further the electrolytic solution was injected, and thus a coin type battery was obtained. This was used as a lithium ion secondary battery of Example 1.

Example 2

A $CaSi_2$-containing composition of Example 2 was produced in the same method as Example 1 except that the amount of Ca added in the molten metal step was 2 g. In the molten metal of Example 2, a mass ratio of Ca, Fe and Si was 38.1:4.6:54.1, and a molar ratio of Ca, Fe and Si was 32.13:2.78:65.09.

Comparative Example 1

A $CaSi_2$-containing composition of Comparative Example 1 was produced in the same method as Example 1 except that the amount of Ca added in the molten metal step was 2.64 g. In the molten metal of Comparative Example 1, a mass ratio of Ca, Fe and Si was 39.5:4.4:52.5, and a molar ratio of Ca, Fe and Si was 33.60:2.69:63.72.

Comparative Example 2

A layered silicon compound of Comparative Example 2, a silicon material of Comparative Example 2, and a lithium ion secondary battery of Comparative Example 2 were produced in the same method as Example 1 except that the molten metal step and the cooling step were not conducted, and the crude $CaSi_2$ was directly used as a $CaSi_2$-containing composition of Comparative Example 2. As described above, in the crude $CaSi_2$, a mass ratio of Ca, Fe and Si was 33.6:5.3:61.2, and a molar ratio of Ca, Fe and Si was 26.94:3.05:70.01.

Table 2 shows the list of $CaSi_2$-containing compositions of Examples 1 to 2, and Comparative Examples 1 to 2.

TABLE 2

|  | x | y | z |
|---|---|---|---|
| Example 1 | 31.06 | 2.88 | 66.06 |
| Example 2 | 32.13 | 2.78 | 65.09 |
| Comparative Example 1 | 33.60 | 2.69 | 63.72 |
| Comparative Example 2 (crude $CaSi_2$) | 26.94 | 3.05 | 70.01 |

Evaluation Example 1

The $CaSi_2$-containing compositions of Example 1, Example 2, Comparative Example 1, and Comparative Example 2 were measured for X-ray diffraction by a powder X-ray diffraction device. The obtained X-ray diffraction charts are shown in FIG. 1.

No peak of crystalline silicon was observed in the X-ray diffraction charts of the $CaSi_2$-containing compositions of Example 1, and Example 2. Although no peak of crystalline silicon was observed in the X-ray diffraction chart of the $CaSi_2$-containing composition of Comparative Example 1, peaks of $Ca_{14}Si_{19}$ were observed. On the other hand, a peak of crystalline silicon was clearly observed in the X-ray diffraction chart of the $CaSi_2$-containing composition of Comparative Example 2.

Thus, a $CaSi_2$-containing composition containing reduced amounts of crystalline silicon and $Ca_{14}Si_{19}$ is confirmed to be provided by the method for producing a $CaSi_2$-containing composition of the present invention.

Evaluation Example 2

Figure 2:
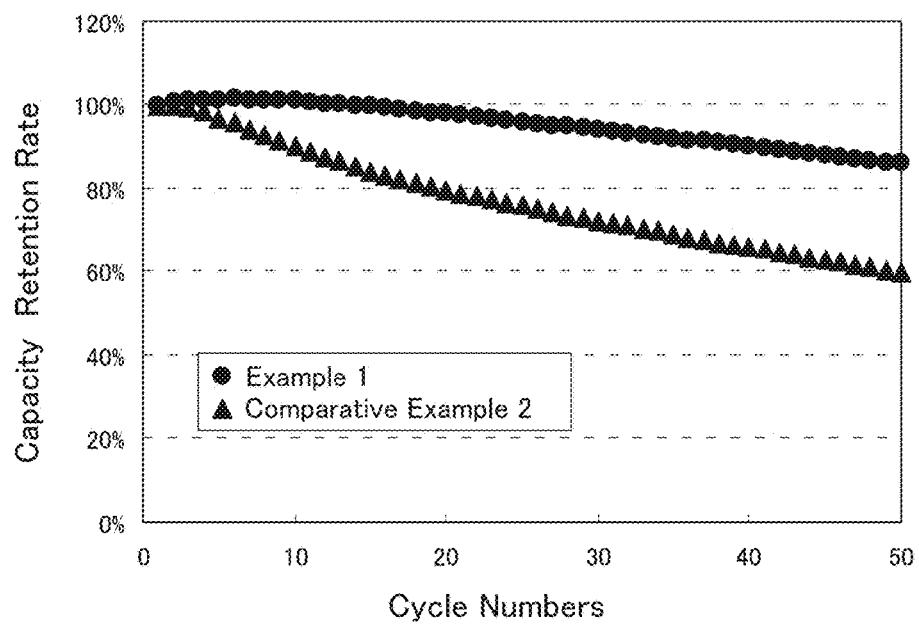
FIG. 2 is a graph showing the relationship between the cycle numbers and the capacity retention rate.

For the lithium ion secondary batteries of Example 1 and Comparative Example 2, 50 cycles of a charging and discharging cycle were conducted. Each charging and discharging cycle included discharging conducted at 0.25C rate until the voltage of the evaluation electrode relative to the counter electrode was 0.01 V, and charging conducted at 0.25C rate until the voltage of the evaluation electrode relative to the counter electrode was 1 V. The rate of the charge capacity in each cycle to the charge capacity of the first time was calculated as a capacity retention rate. The graph of the relation between the cycle numbers and the capacity retention rate is shown in FIG. 2. In Evaluation example 2, occluding Li in the evaluation electrode is called discharging, and releasing Li from the evaluation electrode is called charging.

FIG. 2 reveals that the capacity retention rate of the lithium ion secondary battery of Example 1 is superior to the capacity retention rate of the lithium ion secondary battery of Comparative Example 2. Thus, the secondary battery having the silicon material of the present invention is confirmed to exhibit a suitable capacity retention rate.

Example 3

Using the $CaSi_2$-containing composition of Example 2, a carbon-coated silicon material of Example 3, and a lithium ion secondary battery of Example 3 were produced in the following manner.

Halogen-Containing Polymer Method

A mixture was prepared by mixing 1 part by mass of the $CaSi_2$-containing composition of Example 2 and 1.3 parts by mass of polyvinyl chloride (degree of polymerization: 1100). In the mixture, a molar ratio between Ca and Cl was about 1:2. In an argon atmosphere, the mixture was placed in an electric furnace. The temperature of the electric furnace was set at 200° C., and the mixture was heated at 200° C. for 1 hour. Then, the temperature of the electric furnace was set at 300° C., and the mixture was heated at 300° C. for 1 hour. Further, the temperature of the electric furnace was set at 900° C., and the mixture was heated at 900° C. for 1 hour to obtain a burned substance. The burned substance was washed with water, then washed with acetone, and then dried in a vacuum to obtain a black carbon-coated silicon material of Example 3.

Step of Producing Lithium Ion Secondary Battery

A slurry was prepared by mixing 72.5 parts by mass of the carbon-coated silicon material of Example 3 as the negative electrode active material, 14 parts by mass of polyamide imide as the binding agent, 13.5 parts by mass of acetylene black as the conductive additive, and an appropriate amount of N-methyl-2-pyrrolidone. The rest of the step was conducted in the same method as Example 1 to produce a lithium ion secondary battery of Example 3.

Evaluation Example 3

Figure 3:
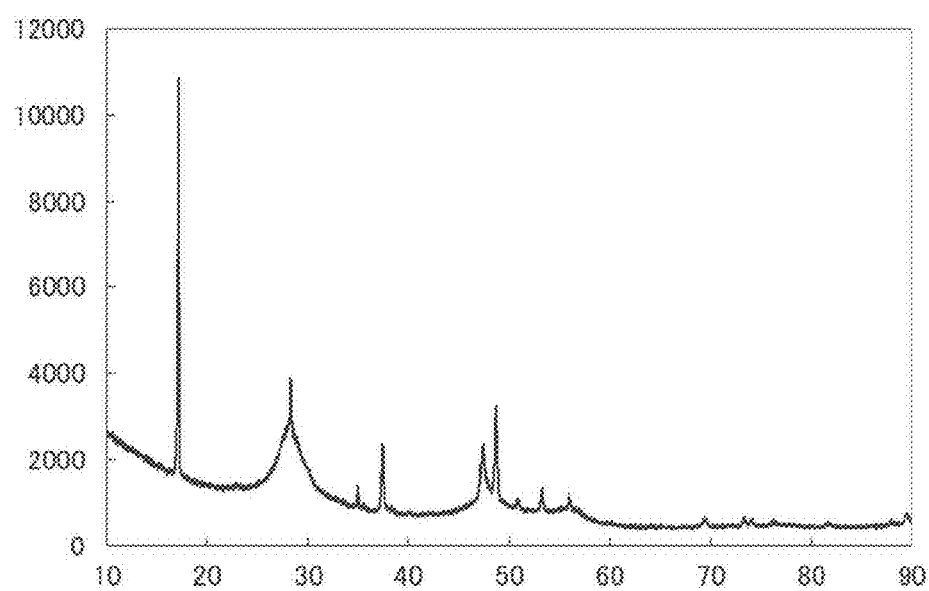
FIG. 3 is an X-ray diffraction chart of a carbon-coated silicon material of Example 3.

The carbon-coated silicon material of Example 3 was measured for X-ray diffraction by a powder X-ray diffraction device. The obtained X-ray diffraction chart is shown in FIG. 3. In the X-ray diffraction chart of the carbon-coated silicon material of Example 3, a broad peak indicating a crystallite size of nano level was principally observed, although a sharp peak indicating crystalline silicon was slightly observed around 28° corresponding to Si crystal.

Figure 4:
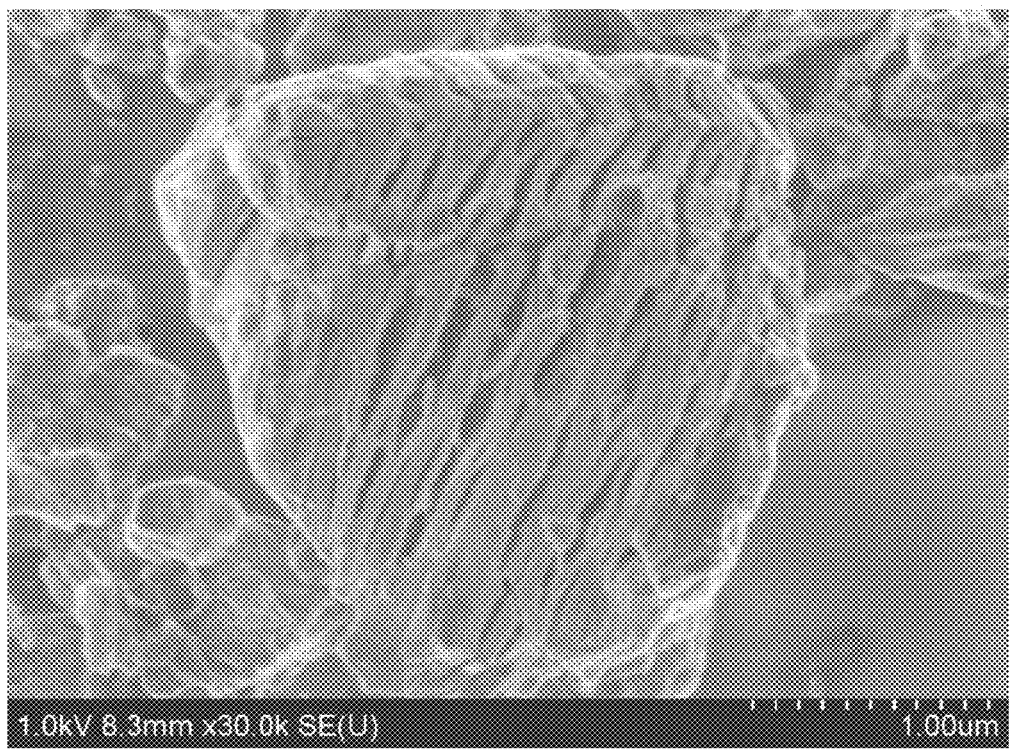
FIG. 4 is an SEM image of the carbon-coated silicon material of Example 3.

Also the carbon-coated silicon material of Example 3 was observed by using a scanning electron microscope (SEM), and a structure in which a plurality of plate-like silicon bodies coated with carbon are laminated in the thickness direction was observed. The observed SEM image is shown in FIG. 4.

Evaluation Example 4

For the lithium ion secondary battery of Example 3, discharging was conducted at 0.25C rate until the voltage of the evaluation electrode relative to the counter electrode was 0.01V, and charging was conducted at 0.25C rate until the voltage of the evaluation electrode relative to the counter electrode was 1 V. In Evaluation example 4, occluding Li in the evaluation electrode is called discharging, and releasing Li from the evaluation electrode is called charging. The rate of the charge capacity to the discharge capacity was calculated as an initial efficiency. The result is shown in Table 3.

TABLE 3

|  | Discharge capacity (mAh/g) | Charge capacity (mAh/g) | Initial efficiency (%) |
| --- | --- | --- | --- |
| Example 3 | 1876.2 | 1428.2 | 76.1 |

Thus, the silicon material in which the $CaSi_2$-containing composition of the present invention is used is confirmed to suitably function as a negative electrode active material of the secondary battery even when the silicon material is produced by a different method.

The invention claimed is:

1. A method for producing a $CaSi_2$-containing composition, the method comprising:
   a molten metal step of adding Ca and/or M (M is at least one element selected from elements of groups 3 to 9) to a $CaSi_2$-containing composition containing crystalline silicon as an impurity to prepare a molten metal containing Ca, M and Si that satisfy the following condition:
   when a molar ratio of Ca, M and Si is x:y:z (x+y+z=100), x, y and z satisfy $23<x\leq100/3$, $0<y<10$ and $64<z\leq200/3$, respectively; and
   a cooling step of cooling the molten metal to obtain the $CaSi_2$-containing composition containing a reduced amount of crystalline silicon.

2. A method for producing a silicon material, the method comprising:
   a step of reacting the $CaSi_2$-containing composition produced by the production method according to claim 1, with acid to obtain a layered silicon compound; and
   a heating step of heating the layered silicon compound at not less than 300° C.

3. A method for producing a secondary battery, the method comprising a secondary battery producing step using the silicon material produced by the production method according to claim 2.

4. A method for producing a silicon material, the method comprising:
   a step of mixing the $CaSi_2$-containing composition produced by the production method according to claim 1 and a halogen-containing polymer, and heating the mixture at a temperature not less than a carbonization temperature of the halogen-containing polymer.

* * * * *